United States Patent [19]
Maeda et al.

[11] Patent Number: 5,835,736
[45] Date of Patent: Nov. 10, 1998

[54] SERIAL DATA TRANSMISSION UNIT

[75] Inventors: Hiromi Maeda; Katsunori Suzuki, both of Tokyo, Japan

[73] Assignee: Mitsubishi Denki Kabushiki Kaisha, Tokyo, Japan

[21] Appl. No.: 861,625

[22] Filed: May 22, 1997

[30] Foreign Application Priority Data

Jan. 8, 1997 [JP] Japan ................................. 9-001388

[51] Int. Cl.⁶ .............................. G06F 13/00; H04L 7/00
[52] U.S. Cl. ......................... 395/290; 395/559; 395/286
[58] Field of Search .................................. 395/290, 286, 395/559, 285, 280; 375/220

[56] References Cited

U.S. PATENT DOCUMENTS

| | | | |
|---|---|---|---|
| 4,689,740 | 8/1987 | Moelands et al. | 395/559 |
| 4,805,194 | 2/1989 | Wesolowski | 375/316 |
| 4,859,815 | 8/1989 | Irwin et al. | 178/69 D |
| 5,195,055 | 3/1993 | Mizuoka et al. | 365/78 |
| 5,678,017 | 10/1997 | Morgan | 365/230.01 |
| 5,687,326 | 11/1997 | Robinson | 395/285 |
| 5,740,189 | 4/1998 | Tiedje | 371/53 |

FOREIGN PATENT DOCUMENTS 1-307335  12/1989  Japan .

*Primary Examiner*—Gopal C. Ray
*Attorney, Agent, or Firm*—Burns, Doane, Swecker & Mathis, LLP

[57] ABSTRACT

A serial data transmission unit which can freely set a holding interval T of the final bit of transmitted data. It includes a holding interval decision portion for determining the holding interval T in accordance with a predetermined integer multiple of the period of a bus clock signal. It can solve a problem of a conventional system in that the dividing value of the bus clock set in a controller must undergo a wide range adjustment in accordance with one of external slaves which requires the longest holding interval when the holding intervals of data differ among the external slaves.

3 Claims, 3 Drawing Sheets

SERIAL DATA TRANSMISSION UNIT

BACKGROUND OF THE INVENTION

1. Field of the Invention

The present invention relates to a serial data transmission unit for transferring serial data, and particularly to a serial data transmission unit to which a plurality of external slaves are connected via buses.

2. Description of Related Art

FIG. 3 is a block diagram showing a conventional serial data transmission unit. In this figure, the reference numeral 31 designates a master including a CPU 32 and a data transmitter 33. The CPU 32 is embedded in a 16-bit single chip microcomputer M31002, and outputs a bus clock signal BCLK. The data transmitter 33 comprises a transmission clock generator 34, a controller 35 and a data transmission portion 36. The reference numerals 37a–37n designate a plurality of external slaves connected to the transmission clock generator 34, controller 35 and data transmission portion 36 through buses $38_1$, $38_2$ and $38_3$.

The transmission clock generator 34, receiving the bus clock signal BCLK from the CPU 32, generates a transmission clock signal SCLKO by dividing the bus clock signal BCLK by "n+1" using a dividing value "n" which is set in the controller 35, and by further dividing it by two.

FIG. 4 illustrates an example of transmission timings when the dividing value "3" is set in the controller 35 of the data transmitter 33.

Next, the operation will be described.

When the master 31 starts its operation, the CPU 32 outputs the bus clock signal BCLK, first. Receiving the bus clock signal BCLK, the transmission clock generator 34 of the data transmitter 33 divides the bus clock signal BCLK by "3+1" when the dividing value set in the controller 35 is "3", and further divides the result by two, thereby generating the transmission clock signal SCLKO.

The controller 35, receiving a transmission data request signal CST from any of the external slaves 37a–37n through the bus $38_2$, has the transmission clock generator 34 and the data transmission portion 36 output the transmission clock signal SCLKO and transmitted data TXD, respectively.

The data transmission portion 36 has a counter, and outputs the transmitted data TXD bit by bit, amounting eight bits D7 . . . D0, to the external slaves 37a–37n via the bus $38_3$ each time it detects the asserting edge AG of the transmission clock signal SCLKO. The external slaves 37a–37n, receiving the transmission clock signal SCLKO, each latch the transmitted data TXD at the negating edges NG of the transmission clock signal SCLKO. Although each one bit of the transmitted data is kept output during the time period from the asserting edge AG to the next asserting edge AG of the transmission clock signal SCLKO, the final bit enters a HiZ state after a short holding interval T beginning from the negating edge NG of the transmission clock signal SCLKO. Here, the HiZ states refers to a state in which the buses $38_1$, $38_2$ and $38_3$ are relinquished after completing the data transmission so that the buses can be used for other purposes.

The conventional serial data transmission unit with such an arrangement outputs the transmitted data bit by bit. In this case, the final bit is kept for only the fixed interval T after the negating edge NG of the transmission clock signal SCLKO. This presents a problem, when holding intervals of data differ among the external slaves, in that the dividing value of the bus clock signal BCLK set in the controller 35 must undergo a wide range of adjustment in accordance with the external slave that demands the longest holding interval.

SUMMARY OF THE INVENTION

The present invention is implemented to solve the foregoing problem. It is therefore an object of the present invention to provide a serial data transmission unit capable of varying the holding interval of the final bit of the transmitted data.

According to the present invention, there is provided a serial data transmission unit comprising a holding interval decision portion for determining a holding interval of a final bit of transmitted data in accordance with a predetermined integer multiple of a bus clock signal. This enables the holding interval of the final bit of the transmitted data to be determined freely by only changing a value set in the holding interval decision portion, thereby making it easy to adjust the holding interval when the external slaves having different holding intervals are connected to the serial data transmission unit. As a result, the buses can be quickly relinquished after the data transmission, which offers an advantage of improving the efficiency of the buses.

DETAILED DESCRIPTION OF THE PREFERRED EMBODIMENT

The invention will now be described with reference to the accompanying drawings.

EMBODIMENT 1

Figure 1:
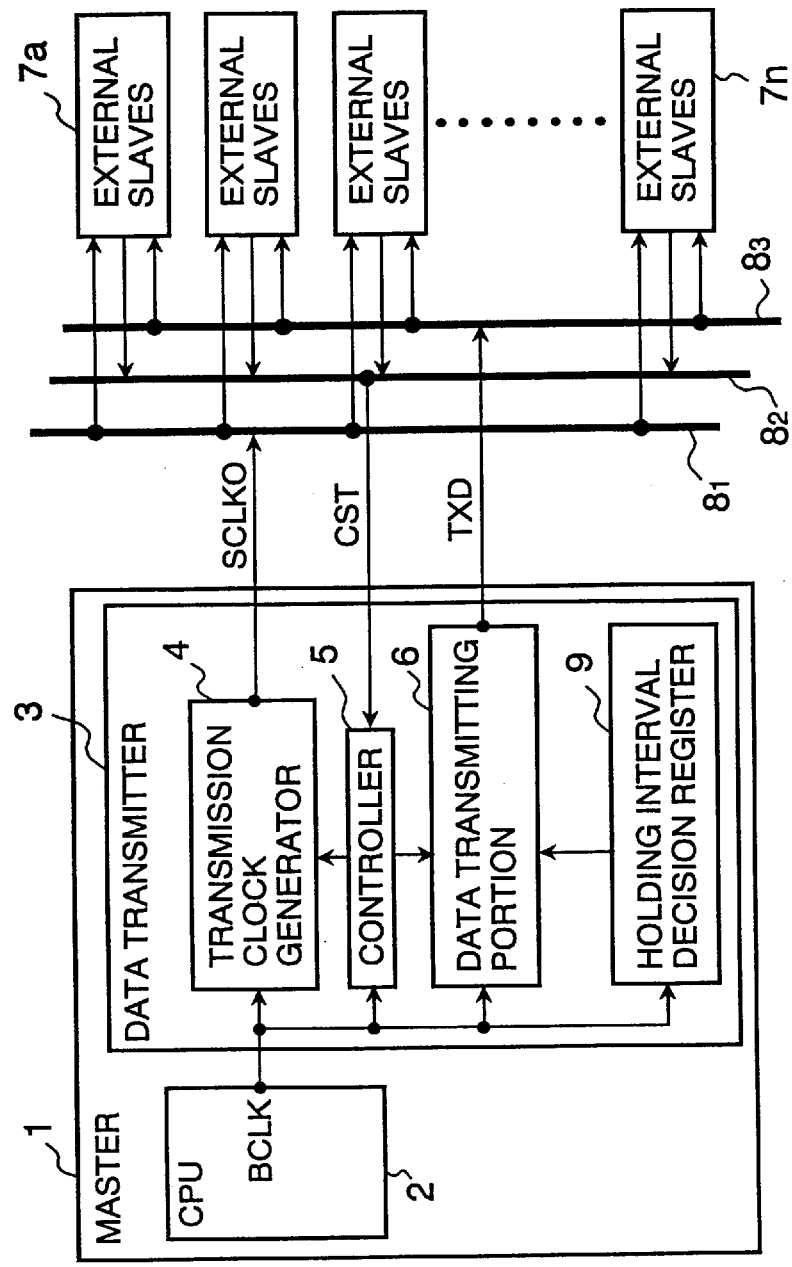
FIG. 1 is a block diagram showing a configuration of an embodiment 1 of a serial data transmission unit in accordance with the present invention.

FIG. 1 is a block diagram showing a configuration of an embodiment 1 of a serial data transmission unit in accordance with the present invention. In this figure, the reference numeral 1 designates a master including a CPU 2 and a data transmitter 3. The CPU 2 is embedded in the 16-bit single chip microcomputer M31002, and outputs a bus clock signal BCLK. The data transmitter 3 comprises a transmission clock generator 4, a controller 5, a data transmission portion 6 and a holding interval decision register 9 as a holding interval decision portion for determining the holding interval of the final bit of transmitted data TXD. The reference numerals 7a–7n designate a plurality of external slaves connected to the transmission clock generator 4, controller 5 and data transmitting portion 6 through buses $8_1$, $8_2$ and $8_3$, respectively.

The transmission clock generator 4, receiving the bus clock signal BCLK from the CPU 2, generates a transmission clock signal SCLKO by dividing the bus clock signal BCLK by "n+1" using a dividing value "n" which is set in the controller 35, and by further dividing it by two.

Figure 2:
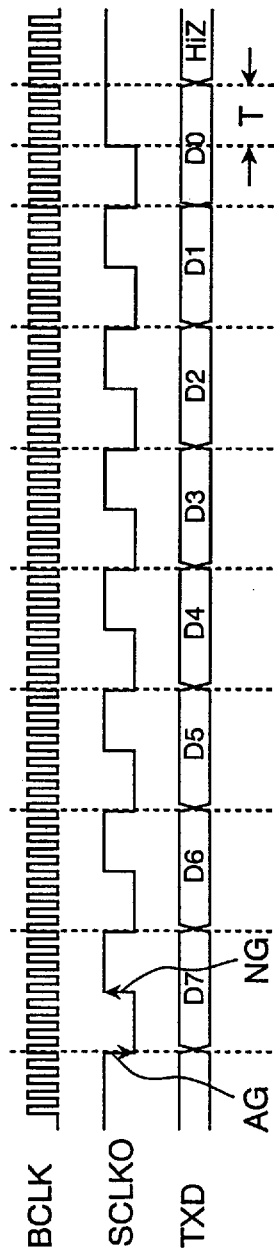
FIG. 2 is a transmission timing chart of the serial data transmission unit as shown in FIG. 1.
Figure 4:
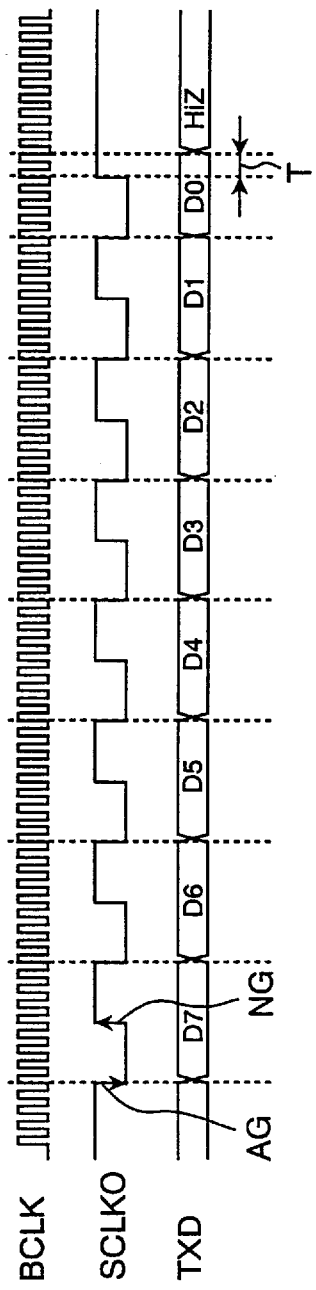
FIG. 4 is a transmission timing chart of the conventional serial data transmission unit.
Figure 3:
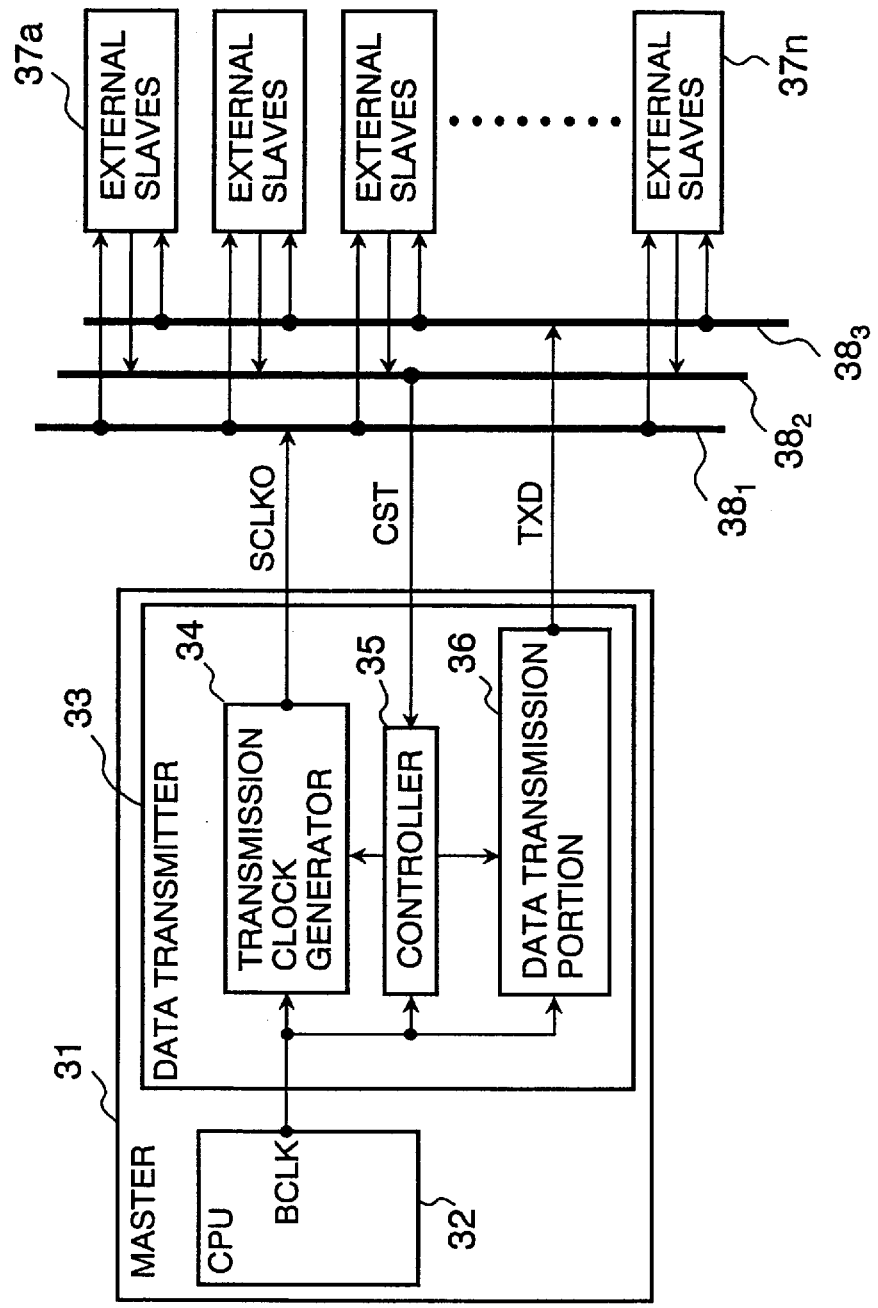
FIG. 3 is a block diagram showing a configuration of a conventional serial data transmission unit.

FIG. 2 illustrates an example of transmission timings when the dividing value of the bus clock signal BCLK is set to "3" in the controller 5 of the data transmitter 3, and an integer multiple m of the bus clock signal BCLK is set to m=4 in the holding interval decision register 9. Here, the integer multiple of the bus clock signal BCLK can be set in the holding interval decision register 9 automatically based on a value read from a program by the CPU 2, or manually with an external set means not shown in this figure. In this case, the integer multiple of the bus clock signal BCLK can be set considering the longest one of the data holding intervals of the external slaves.

Next, the operation will be described.

When the master 1 starts its operation, the CPU 2 outputs the bus clock signal BCLK, first. Receiving the bus clock signal BCLK, the transmission clock generator 4 of the data transmitter 3 divides the bus clock signal BCLK by "3+1" when the dividing value set in the controller 5 is "3", and further divides the result by two, thereby generating the transmission clock signal SCLKO.

The controller 5, receiving a transmission data request signal CST from any of the external slaves 7a–7n through the bus $8_2$, has the transmission clock generator 4 and the data transmitting portion 6 transfer the transmission clock signal SCLKO and transmitted data TXD, respectively.

The data transmitting portion 6 has a counter, and outputs the transmitted data TXD bit by bit, amounting eight bits D7 ... D0, to the external slaves 7a–7n via the bus $8_3$, each time it detects the asserting edge AG of the transmission clock signal SCLKO. The external slaves 7a–7n, receiving the transmission clock signal SCLKO, each latch the transmitted data TXD at the negating edges NG of the transmission clock signal SCLKO. Although each bit of the transmitted data is kept output during the time period from the asserting edge AG to the next asserting edge AG of the transmission clock signal SCLKO, the holding interval T of the final bit is determined by the holding interval decision register 9. For example, when the value "m" set in the holding interval decision register 9 is four, the holding interval T is set at four times the period of the bus clock signal BCLK beginning from the negating edge NG of the transmission clock signal SCLKO, and the HiZ state is started after the holding interval T by the data transmitting portion 6 which is controlled by the output of the holding interval decision register 9.

According to the embodiment 1, since the holding interval of the final bit of the transmitted data TXD can be freely set by only changing the value set in the holding interval decision register 9, the connection of the external slaves 7a–7n having different holding intervals can be readily carried out.

What is claimed is:

1. A serial data transmission unit comprising:

a CPU (central processing unit) for producing a bus clock signal;

a transmission clock generator which receives said bus clock signal, and generates a continuous transmission clock signal;

a data transmitting portion for transferring transmitted data;

a controller for controlling said transmission clock generator and said data transmitting portion to transfer said transmission clock signal and said transmitted data, respectively, to a plurality of external slaves through a bus, when said controller receives a transmitted data request signal from any of said plurality of external slaves connected to said controller through said bus; and holding interval decision portion for determining a holding interval of a final bit of said transmitted data in accordance with a predetermined integer multiple of a period of said bus clock signal.

2. The serial data transmission unit as claimed in claim 1, wherein said CPU reads a value from a program, and sets said value into said holding interval decision portion as said integer multiple.

3. The serial data transmission unit as claimed in claim 2, wherein said value read from the program by said CPU is determined considering a longest one of data holding intervals of said plurality of external slaves.

* * * * *